US008578408B2

(12) United States Patent
Tom et al.

(10) Patent No.: US 8,578,408 B2
(45) Date of Patent: *Nov. 5, 2013

(54) METHOD AND APPARATUS FOR PROVIDING DIRECTED ADVERTISING BASED ON USER PREFERENCES (75) Inventors: Richard W. Tom, Los Angeles, CA (US); Eric I. Feng, Marina del Rey, CA (US); Hua Zheng, Beijing (CN); Jean-Paul Colaco, Manhattan Beach, CA (US); Adam W. Miller, Newport Beach, CA (US)

(73) Assignee: Hulu, LLC, Santa Monica, CA (US)

( * ) Notice: Subject to any disclaimer, the term of this patent is extended or adjusted under 35 U.S.C. 154(b) by 240 days.

This patent is subject to a terminal disclaimer.

(21) Appl. No.: 12/401,547

(22) Filed: Mar. 10, 2009

(65) Prior Publication Data
US 2009/0228920 A1 Sep. 10, 2009

Related U.S. Application Data (60) Provisional application No. 61/035,243, filed on Mar. 10, 2008.

(51) Int. Cl.
*H04N 7/10* (2006.01)
*H04N 7/025* (2006.01)

(52) U.S. Cl.
USPC ............... 725/34; 725/32; 725/35; 725/36; 705/14.4

(58) Field of Classification Search
USPC ................................... 725/32–36
See application file for complete search history.

(56) References Cited

U.S. PATENT DOCUMENTS

| 5,832,494 A | 11/1998 | Egger et al. |
| 5,838,314 A | 11/1998 | Neel et al. |
| 5,889,506 A | 3/1999 | Lopresti et al. |
| 5,892,536 A | 4/1999 | Logan et al. |
| 6,199,082 B1 | 3/2001 | Ferrel et al. |
| 7,627,548 B2 | 12/2009 | Riley et al. |
| 7,877,404 B2 | 1/2011 | Achan et al. |

(Continued)

FOREIGN PATENT DOCUMENTS

| EP | 1197020 | 11/2007 |
| GB | 2323489 | 9/1998 |

(Continued)

OTHER PUBLICATIONS

"Gotuit and Pixsy Raise the Bar on Video Search," http://www.gotuit.com/press/2008/0930_Pixsy.html, 3 pages.

(Continued)

*Primary Examiner* — Jeremy Duffield
(74) *Attorney, Agent, or Firm* — Fountainhead Law Group P.C.

(57) ABSTRACT

A method, apparatus, article of manufacture, and a memory structure for providing advertisements into a streamed media program is disclosed. One embodiment comprises a user computer for accepting user input, the user input directly defining user preferences regarding the presentation of the advertisements in the streamed media program and for inserting advertisements in the streamed media program according to the defined user preferences; and a media program provider communicatively coupled to the user computer, for transmitting the streamed media program to the user computer for presentation to the user on a display communicatively coupled to the user computer.

15 Claims, 9 Drawing Sheets

(56) References Cited

U.S. PATENT DOCUMENTS

| | | |
|---|---|---|
| 2002/0016736 A1* | 2/2002 | Cannon et al. .................. 705/14 |
| 2002/0032019 A1 | 3/2002 | Marks et al. |
| 2002/0097979 A1* | 7/2002 | Lowthert et al. ............... 386/46 |
| 2002/0104096 A1 | 8/2002 | Cramer et al. |
| 2002/0188621 A1 | 12/2002 | Flank et al. |
| 2003/0149975 A1* | 8/2003 | Eldering et al. ................ 725/34 |
| 2003/0154475 A1* | 8/2003 | Rodriguez et al. .............. 725/32 |
| 2003/0167202 A1 | 9/2003 | Marks et al. |
| 2004/0071453 A1 | 4/2004 | Valderas |
| 2004/0080528 A1 | 4/2004 | Rand et al. |
| 2004/0268413 A1 | 12/2004 | Reid et al. |
| 2005/0132398 A1* | 6/2005 | Baran et al. ..................... 725/28 |
| 2005/0193015 A1 | 9/2005 | Logston et al. |
| 2006/0015925 A1 | 1/2006 | Logan |
| 2006/0190808 A1 | 8/2006 | Balthaser |
| 2007/0118512 A1 | 5/2007 | Riley et al. |
| 2007/0162328 A1 | 7/2007 | Reich |
| 2007/0244900 A1 | 10/2007 | Hopkins et al. |
| 2008/0033773 A1 | 2/2008 | Brazell |
| 2008/0060001 A1 | 3/2008 | Logan et al. |
| 2008/0066107 A1 | 3/2008 | Moonka et al. |
| 2008/0115161 A1* | 5/2008 | Kurzion .......................... 725/32 |
| 2008/0127251 A1* | 5/2008 | Wachtfogel et al. ........... 725/34 |
| 2008/0196060 A1* | 8/2008 | Varghese ........................ 725/34 |
| 2009/0024927 A1 | 1/2009 | Schrock et al. |
| 2009/0070675 A1 | 3/2009 | Li |
| 2009/0210899 A1* | 8/2009 | Lawrence-Apfelbaum et al. .............................. 725/34 |
| 2010/0082585 A1 | 4/2010 | Barsook et al. |
| 2010/0082661 A1 | 4/2010 | Beaudreau |

FOREIGN PATENT DOCUMENTS

| | | |
|---|---|---|
| GB | 2443959 | 5/2008 |
| WO | 00/58940 | 10/2000 |
| WO | 2005/001656 | 1/2005 |
| WO | 2005/003899 | 1/2005 |
| WO | 2007/030621 | 3/2007 |
| WO | 2007/030751 | 3/2007 |
| WO | 2007/130472 | 11/2007 |
| WO | 2008/011091 | 1/2008 |

OTHER PUBLICATIONS

"Gotuit Announces Integration with DoubleClick," http://www.gotuit.com/press/2008/1022_DoubleClick.html, 1 page.

"Gotuit Publishes White Paper: 'The Currency of Internet Video,'" http://www.gotuit.com/press/2008/1028_Whitepaper_CurrencyOfInternetVideo.html, 1 page.

"The Currency of Internet Video: The Importance of Quality Metadata in Monetizing Internet Video," Gotuit White Paper, Oct. 2008, pp. 1-13.

* cited by examiner

METHOD AND APPARATUS FOR PROVIDING DIRECTED ADVERTISING BASED ON USER PREFERENCES

CROSS-REFERENCE TO RELATED APPLICATIONS

This application claims benefit of U.S. Provisional Patent Application No. 61/035,243, entitled "METHOD OF DELIVERING ADVERTISEMENTS TO A USER," by Adam Miller, filed Mar. 10, 2008, which application is hereby incorporated by reference herein.

BACKGROUND OF THE INVENTION

1. Field of the Invention

The present invention relates to systems and methods for providing streaming media to users, and in particular, to a system and method for directed advertising in said streaming media.

2. Description of the Related Art

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially and consecutively until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and is also often choppy and/or contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is typically delivered from a few dedicated servers having high bandwidth capabilities.

The delivery of media programs can be accomplished under a variety of models. In one model, the user pays for the viewing of the media program (for example, using a pay-per-view service). In another model widely adopted by broadcast television shortly after it's inception, sponsors pay for the presentation of the media program in exchange for the right to present advertisements during or adjacent to the presentation of the program The advent of DVRs has had a profound effect upon the advertising model described above. DVRs permit the user to record media programs (in advance or during their broadcast), and permit the user to easily bypass advertisements presented during the media program by use of trick-play functions such as fast forward and reverse.

However, DVRs care not capable of these operations with a media program when the media program is provided as streaming media. In such cases, the user must view the advertisements. The fact that users cannot skip advertisements within streamed media using a DVR-like device is both a strength and a weakness of this media program delivery paradigm. It is a strength, because advertisers can be assured that the viewers are actually watching the advertisements placed within the media program and not skipping them. However, it also represents a barrier to the widespread viewing of media programs via streaming media because users prefer to skip advertisements that are not of interest. What is needed is a method and apparatus for providing advertisements to users receiving streaming media in which the users can directly select preferences with regard to which advertisements they would like to receive and which they would not. The present invention satisfies that need.

SUMMARY OF THE INVENTION

To address the requirements described above, a method, apparatus, article of manufacture, and a memory structure for providing advertisements into a streamed media program. One embodiment comprises a user computer for accepting user input, the user input directly defining user preferences regarding the presentation of the advertisements in the streamed media program and for inserting advertisements in the streamed media program according to the defined user preferences; and a media program provider communicatively coupled to the user computer, for transmitting the streamed media program to the user computer for presentation to the user on a display communicatively coupled to the user computer. In another embodiment, a method for providing advertisements into a streamed media program, comprises the steps of accepting user input from a user computer communicatively coupled to a media streaming server, the user input directly defining user preferences regarding the presentation of the advertisements in the streamed media program;

inserting advertisements in the streamed media program according to the defined user preferences; and transmitting the streamed media program to the user computer for presentation to the user on a display communicatively coupled to the user computer.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
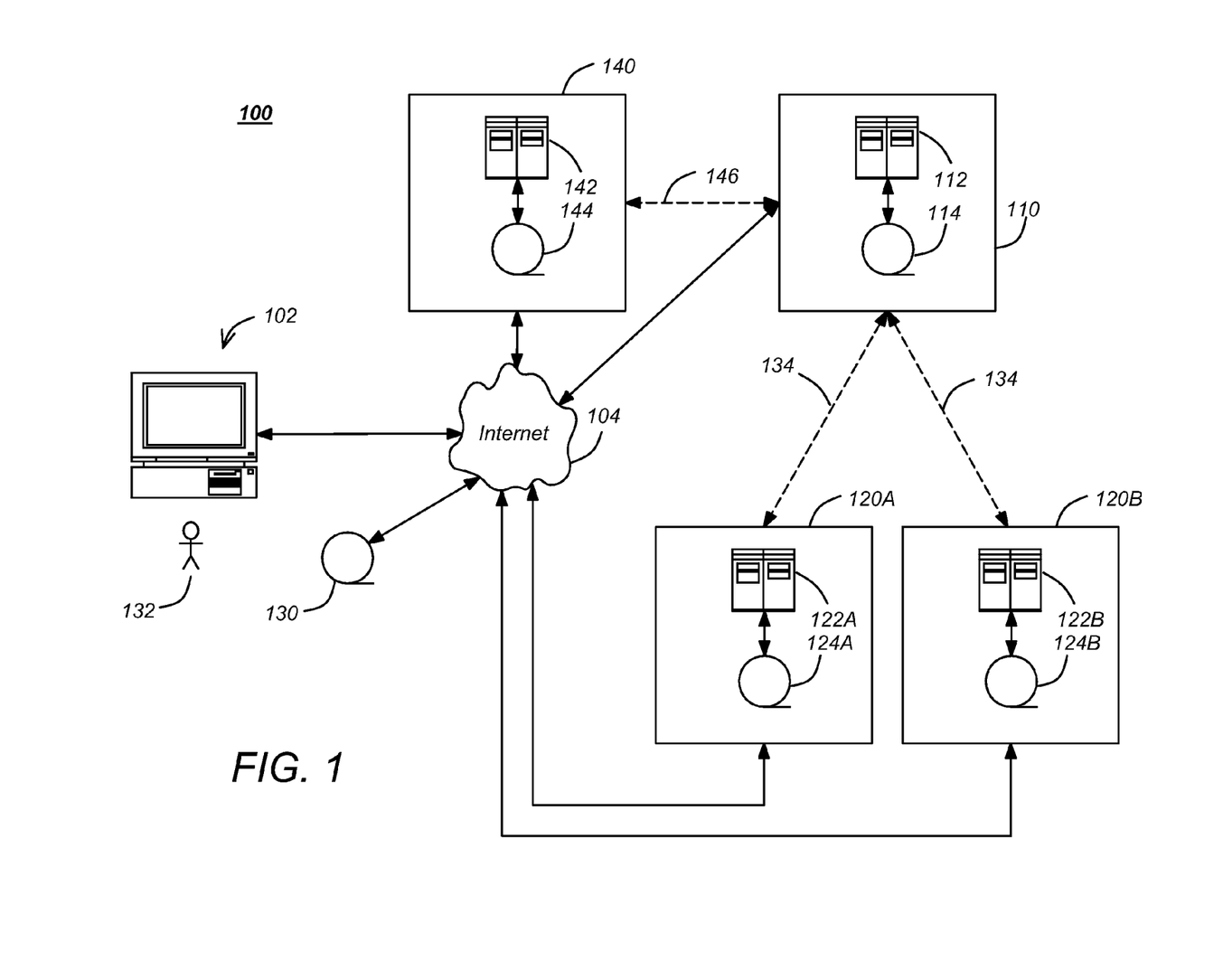
FIG. 1 is a diagram illustrating an exemplary media program system.

FIG. 1 is a diagram illustrating an exemplary media program system 100. In the illustrated embodiment, the system 100 may comprise one or more media program sources 120A, 120B, communicatively coupled to a communication network 104 such as the Internet and each having one or more source video servers 122A, 122B communicatively coupled to one or more source media program databases 124A, 124B. The media program system 100 further comprises and a media program provider 110, communicatively coupled to the communication network 104, and having one or more provider video servers 112 and a provider media program database 114. In one embodiment, the media program provider 110 is a video-on-demand and/or streaming media program provider.

The media program system 100 may stream media programs to the user's computer 102 directly from the media program provider 110, or the media program provider 110 may operate as a portal, providing an interface to the media programs available from the media program sources 120A and 120B, but not the media program itself (which is instead provided by the media program source 120).

In the first case, the media program provider licenses media programs from the media program sources 120 (such as www.fox.com or www.nbc.com), and metadata for such programs is also typically provided as well. Such metadata is typically adequate (e.g. it need not be supplemented by information from other sources) and can be retrieved by the media program provider's database 114 for use.

In the second case (e.g. when direct streaming is not licensed), the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent media program source 130 (such as www.tv.com or www.imdb.com) or other third party sources. In this circumstance, the role of the media program provider 110 is that of a portal that provides users 132 a list of available media programs and an interface to search to find such programs and to view them.

Media programs and metadata may be obtained via the communication network 104 or through auxiliary (and/or dedicated) communication links 134 by webcrawling (for example, using a program or automated script that browses the World Wide Web in a methodical, automated manner).

Using the computer 102, remote users 132 can communicate with the media program provider 110, to obtain media programs (including video-on-demand and/or streaming video services) and to search the provider media program database 114 to find media programs of interest.

The media program system 100 may also comprise one or more advertisement provider 140. Advertisement sources provide advertisements to the media program provider 110 for insertion into the streamed media programs. The advertisements may be provided to the media program provider 110 using the Internet 104 or a dedicated link 146. Also, the advertisements may be stored in the media program provider 110 and streamed with the media program to the user computer 102, or the advertisement may be streamed from one or more of the advertisement source(s) 140. In the illustrated embodiment, the advertisement provider 140 includes an advertisement provider server 142 communicatively coupled to an associated and communicatively coupled advertisement provider database 144.

Figure 2:
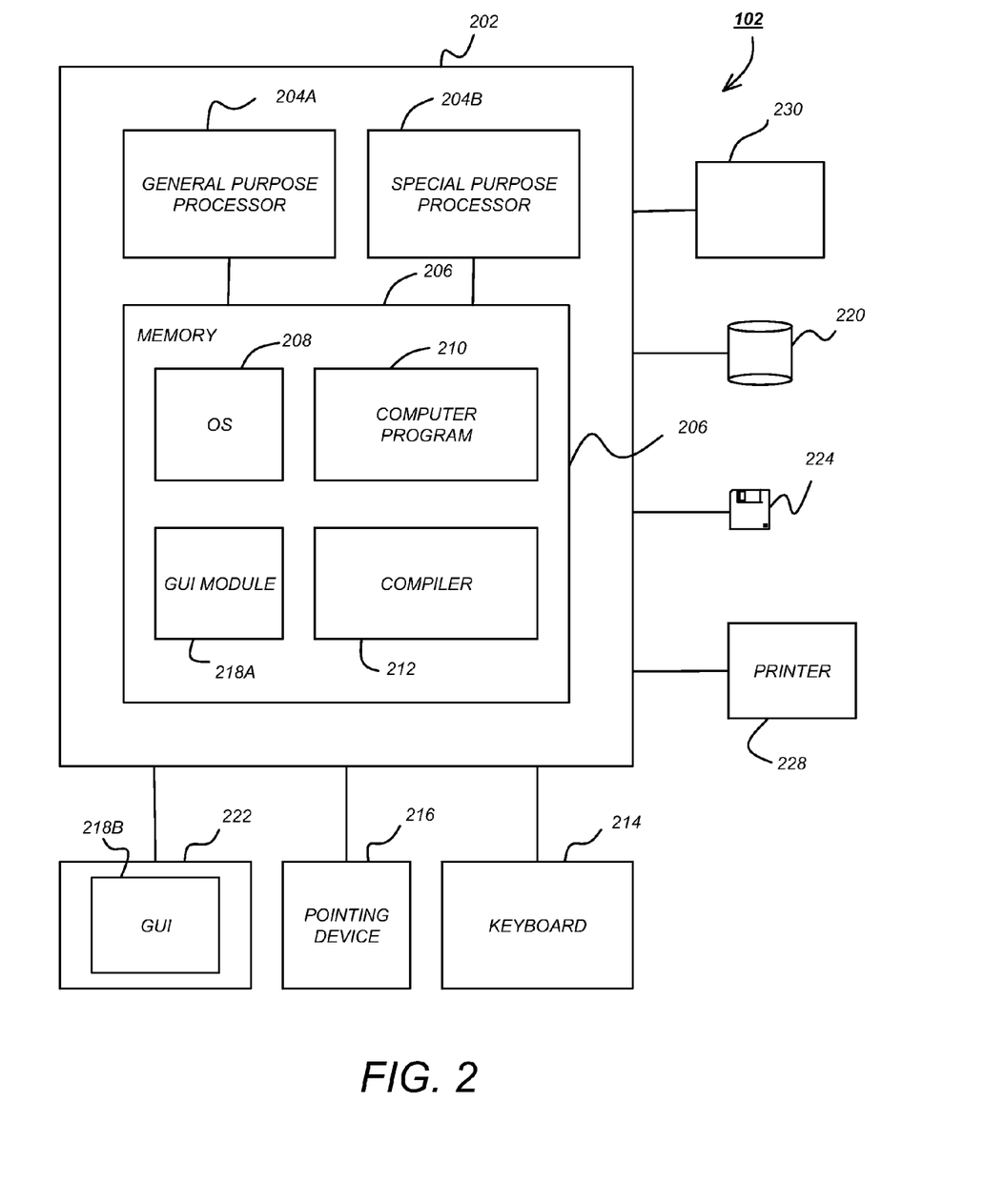
FIG. 2 illustrates an exemplary computer system that could be used to implement the present invention.

FIG. 2 illustrates an exemplary computer system 202 that could be used to implement elements the present invention, including the user computer 102, servers 112, 122, and 142 and the databases 114, 124, and 144. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user 132 and/or other devices to accept input and commands and, based on such input and commands and the instructions defined by the computer program 210 and operating system 208 to provide output and results.

Output/results may be presented on the display 222 or provided to another device for presentation or further processing or action. In one embodiment, the display 222 comprises a liquid crystal display (LCD) having a plurality of separately addressable liquid crystals. Each liquid crystal of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, the some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Although the term "user computer" is referred to herein, it is understood that a user computer 102 may include portable devices such as cellphones, portable MP3 players, video game consoles, notebook computers, pocket computers, or any other device with suitable processing, communication, and input/output capability.

Figure 3:
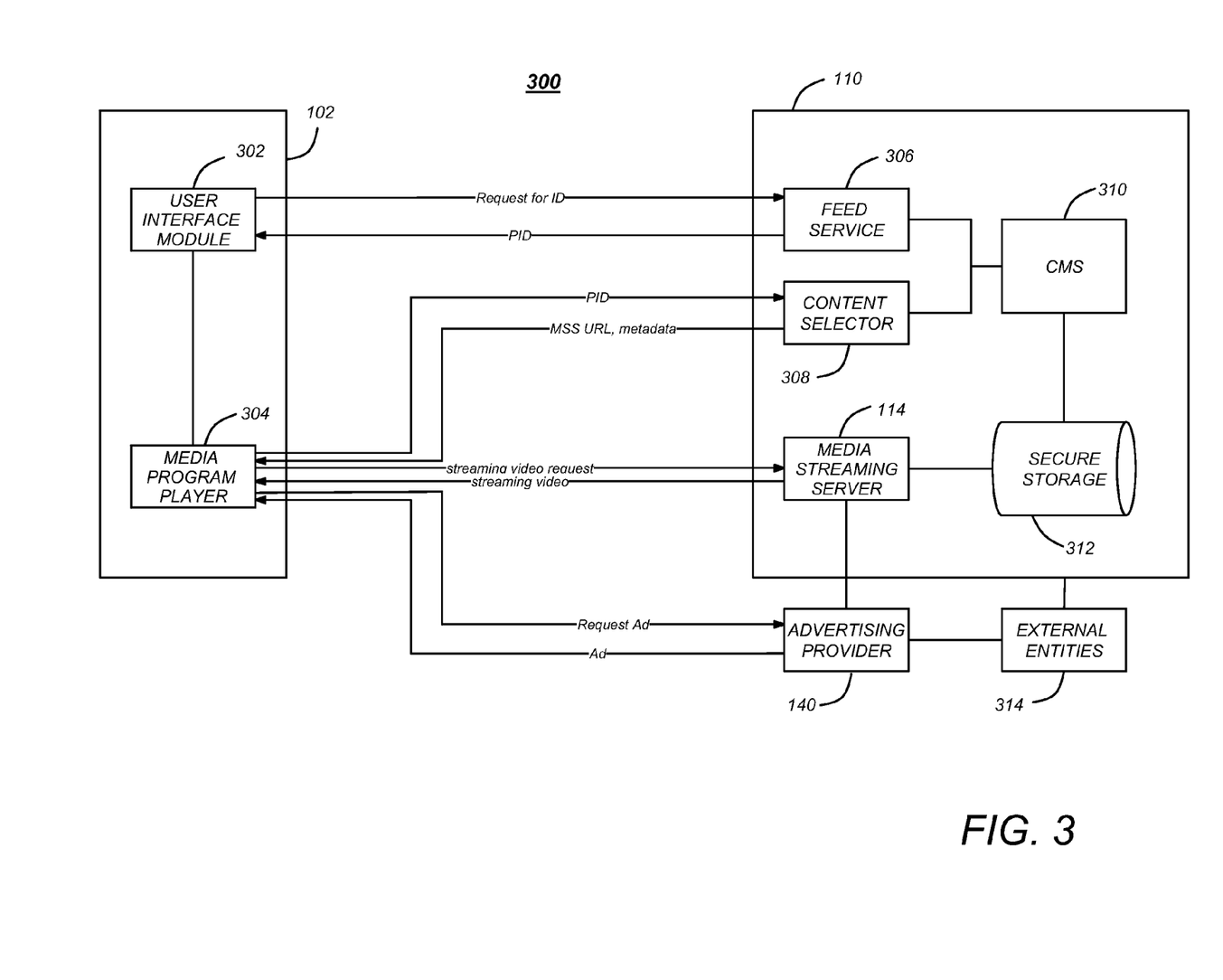
FIG. 3 is a diagram illustrating a content delivery subsystem and top-level operations that can be used to deliver media programs and advertisements for presentation to a user.

FIG. 3 is a diagram illustrating a content delivery subsystem (CDS) 300 and top-level operations that can be used to deliver media programs and advertisements for presentation to a user 132. The content delivery subsystem 300 includes the user computer 102, the media program provider 110, and an advertisement provider 140. Although the advertisement provider 140 is illustrated as a separate architectural entity than the media program provider 110, the advertisement provider 140 may be integrated within the media program provider 110. The CDS 300 provides a means to provide media programs and advertisements across a plurality of distribution networks, which may include www.hulu.com, www.imdb.com, www.aol.com or www.msn.com. Metadata related to media program and advertisement content is stored in the content delivery system 300, as is data describing where the media programs and advertisements may be found within the CDS 300.

The user computer 102 includes an interface module 302 and a media program player 304. The interface module 302 includes instructions performed by the user computer 102 that are used to present information to the user 132 and to accept user input, including commands. The presented information may include a program guide, advertisement options (as discussed further below), and the user input may include selected advertisement options and media program playback selections.

Using the user computer 102 and the interface module 302, the user 132 enters a choice for a media program. The user interface module 302 transmits a message to a feed service 306 implemented by the media program provider 110 for a program identifier (PID). The PID is used to identify content such as a specific media program running on a specific distribution network. For example, season 2 of "The Office" running on www.hulu.com will have a different PID than the same exact show running on msn.com. In one embodiment, every media program stored in a distribution network. The feed service 306 then returns the PID to the user interface module 302. The PID and associated commands (e.g. the play command) are provided to the media program player 304. The media program player 304 may be embedded in a webpage from a third party, or may be part of a webpage maintained by the media program provider 110.

The media program player 304 transmits the PID to a content selector 308 implemented by the media program provider 110. The content selector 308 identifies the actual path (uniform resource locator or URL, for example) to the requested media program associated with the transmitted PID, as well as programming metadata that is used by the media program player 304 to help identify restrictions (for example, preventing access to adult-themed content if the user 132 is known to be under 18), ad targeting rules as well as advertising breaks. The advertising breaks indicate where advertisements may be inserted, and can be specified in terms of the time since the beginning of the media program, the time remaining, or any other suitable measure. The URL and the metadata are then transmitted to the media program player 304. The media program player provides a streaming video request to the media streaming server 114 at the URL received from the content selector 308. The streaming video request includes the PID and may include other information as well.

The media streaming server (MSS) 114 responds to the streaming video request by providing the streaming video to the user computer 102. In one embodiment, the MSS 114 is a service provider that has a wide range of geographically distributed computers that house replicated copies of media programs and website content. The MSS 114 can be a third party provider (e.g. only contractually associated with the media program provider 110), or can be part of the media program provider 110. Geographically diverse servers assures that when the user 132 requests playback of a media program, the media program is streamed from a geographically local server, to increase media program playback performance. Multiple servers also offer redundancy.

The MSS 114 obtains the media program from secure storage 312 which may be disposed in the media program provider 110 facility, or which may be disposed at a third party facility. The content management service 310 interfaces with the feed service 306, the content selector 308, and secure storage 312 to manage which media programs are provided to the media streaming server 114. External entities can include third parties such entities that provide the advertisements that are to be displayed to the user (which includes sponsors and/or their advertising agencies), third party providers of media programs, and entities from which the user 132 may purchase goods or services as further described below.

The media program player 304 plays the media program, and at the times identified in the advertising breaks defined above, requests advertisements from the advertising provider 140 using a path (e.g. URL) provided either by the content selector 308 or the media streaming server 114. The advertising provider 140 streams the requested advertisement is streamed to the media program player 304 at the appropriate time, where it is displayed to the user 132.

Figure 4A:
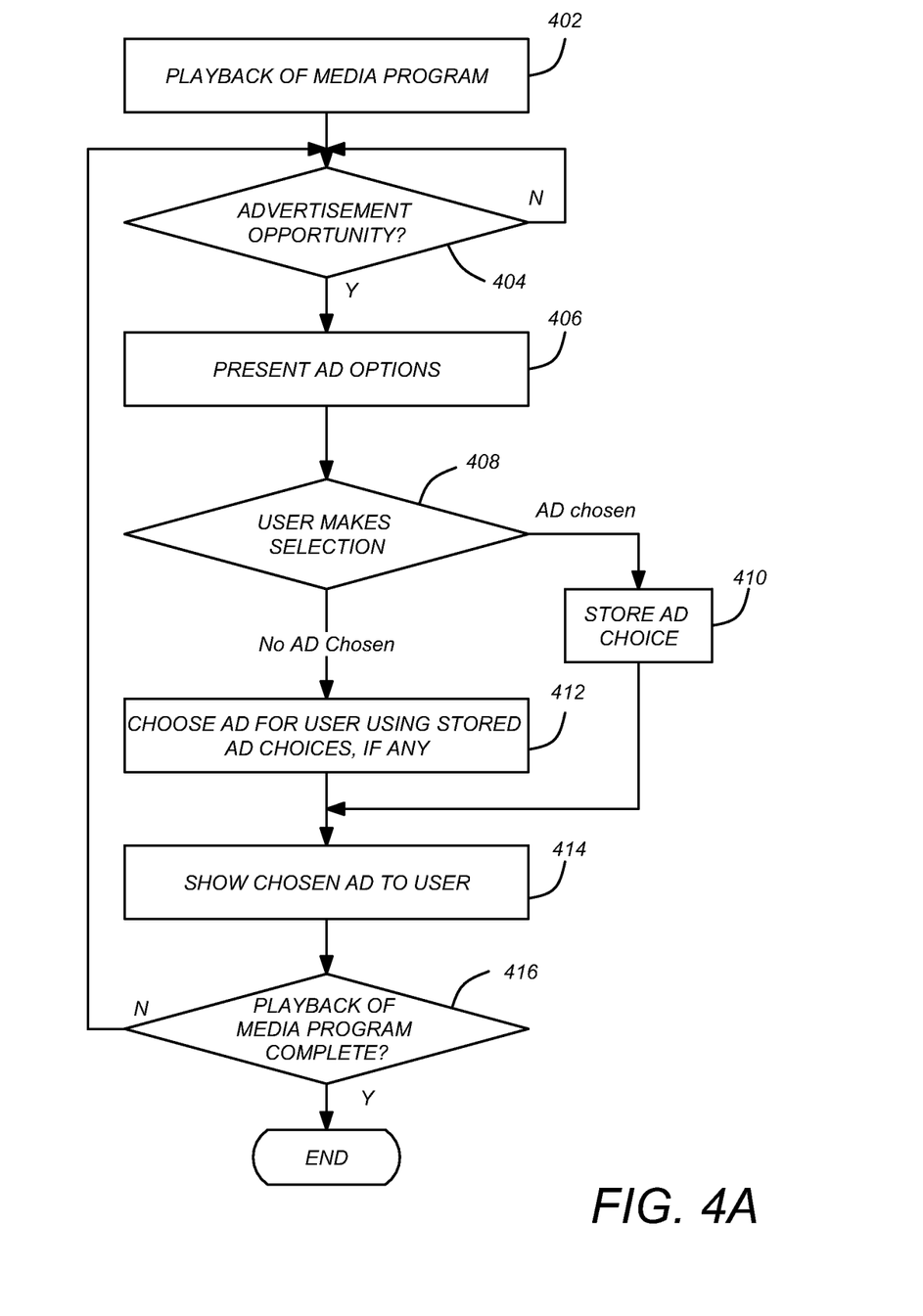
FIGS. 4A and 4B are diagrams illustrating exemplary method steps that can be used to insert advertisements into a streamed media program.

FIG. 4A is a diagram illustrating exemplary method steps that can be used to insert advertisements into a streamed media program. In block 402, the playback of a media program commences. Block 404 determines whether there is an advertisement opportunity during the playback of the media program. In one embodiment, the advertisement opportunity is determined using the advertising breaks described above.

Block 406 presents advertising options to the user 132. The advertising options may be a simple matter of directly selecting which advertisements the user 132 wishes to see, or more complex advertising options may be presented for selection as described in more detail below and with regard to FIGS. 5A-6B.

Turning first to the simple case of simply directly selecting which advertisements the user 132 would like to view or how the user 132 would like to see them during the advertising breaks in the media program, block 408 determines whether the user 132 has made a selection. If no advertisement(s) were chosen, processing proceeds to block 412, where an advertisement is chosen for the user 132 using previously stored choices or other factors such as user profiles, or user viewing preferences. If one or more advertisements were selected, the selection is stored for later use . . . both to play the selected advertisement, and in one embodiment, to select advertisements in the future when none are selected or if an insufficient number are selected.

In block 414, the chosen advertisements are streamed to the user computer 102 and shown to the user 132. In one embodiment, if the user 132 only selected N advertisements and there were N+1 advertising slots in the advertisement break, further advertisements are chosen for streaming and presentation to the user 132 for these unchosen advertisement slots.

Block 416 determines whether the playback of the media program is complete. If it is not complete, processing returns to block 404 to await another advertisement opportunity. If playback is complete, processing of the current media program ends.

The present invention need not be implemented such that the commencement of the media program begins before the advertisement selections are made. In one embodiment, the advertising options are presented to the user 132 in advance of the selection of the media program.

Figure 4B:
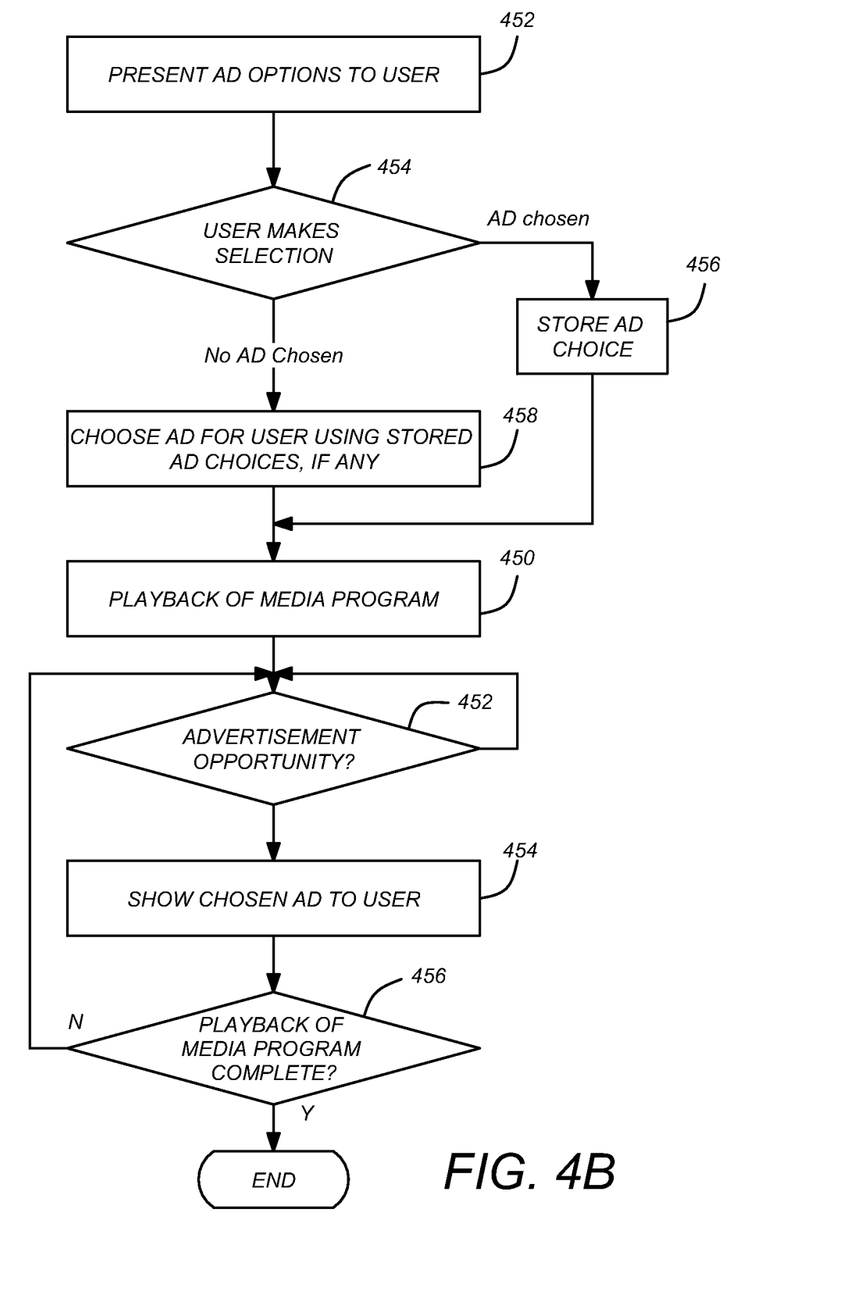

FIG. 4B is a flow chart depicting exemplary method steps that can be used to practice a second embodiment of the invention in which the advertisement options are presented to the user 132 in advance of the media program playback.

In block 452, advertising options are presented to the user 132 for selection. In block 454, a determination is made as to whether the user 132 has selected any advertisements. If no advertisement is chosen, a choice is made for the user 132 without further input using previously stored choices or other available information, as shown in block 458. If one or more choices have been made, the choices are stored for later use in block 456. In block 450, playback of the selected media program begins. During playback of the media program, advertisement opportunities (or advertisement breaks) occur. When such advertisement opportunities occur, the ad is shown to the user 132, and this process is repeated until playback of the media program is complete, as shown in blocks 452-456.

Figure 5A:
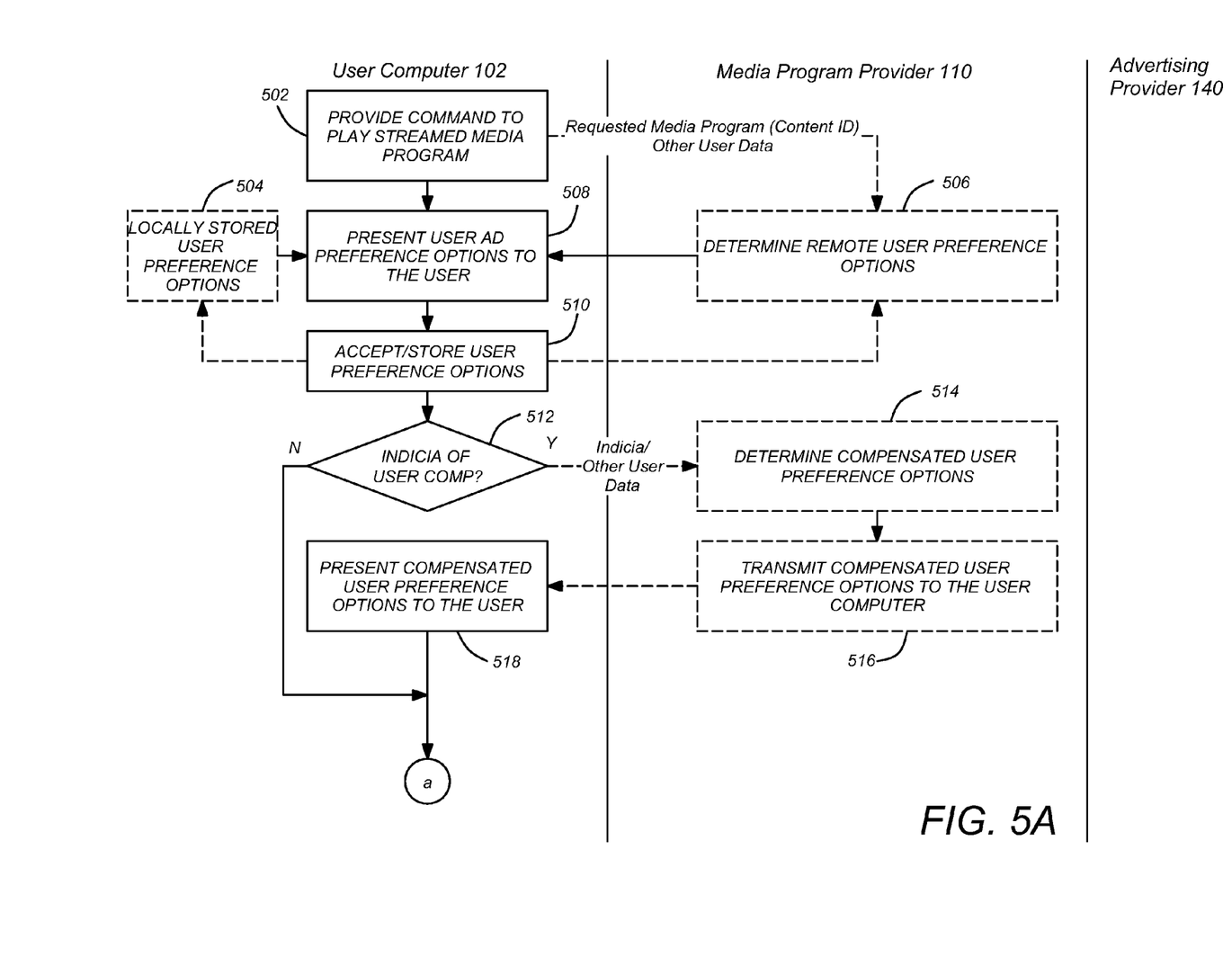
FIGS. 5A ad 5B are diagrams illustrating further embodiments and details regarding the acceptance and use of advertisement options in connection with the playback of a media program, illustrating possible functional allocation among the hardware elements.

FIG. 5A is a diagram illustrating further embodiments and details regarding the acceptance and use of advertisement options in connection with the playback of a media program, illustrating possible functional allocation among the hardware elements. In block 502, the user computer 102 accepts a command from the user 132 to play a streamed media program. The user computer 102 provides a command to play the streamed media program to the media program provider 110. In one embodiment, the command to play the streamed media program is accepted by the feed service 306, which returns a program identifier (PID). In another embodiment, the PID for multiple media programs that are available is transmitted to the user computer 102 in advance as a part of a program guide.

In block 502, user advertisement preference options are presented to the user 132 by the user computer 102. The information for presenting such options can be locally stored (e.g. in a memory of the computer 102 as shown in block 504), or they can be stored by the media program provider 110 or third party (as shown in block 506) and transmitted to the user computer 102 when needed. In block 508, the user advertisement preference options are received in the user computer 102 and presented to the user 132 for selection The advertisement options presented can include any combination of the following:

Presenting which advertisements the user 132 can view in the current commercial break:

The advertisements can be presented via a named list, icons, or thumbnails that can be selected by the user 132. In one embodiment, the options presented are selected based upon either information about the user 132 that is provided either via an independent interface, from previous advertisement selections, from a third party 314 database, or from the media program that was selected by the user 132 to be played (which can be identified by metadata associated with the streamed media program). For example, the user 132 may be presented with list showing a SNICKERS bar, a LA-Z-BOY recliner, and NETFLIX if the previous user 132 advertisement selections indicated that the user 132 was interested in these products or if the user 132, based on the current program viewed or the user's history of program viewing, survey information, or other information, was thought to lead a sedentary lifestyle. If previous advertisement selections, the current program being viewed, the user's viewing history and/or survey information indicated that the user 132 would likely be interested in different advertisements, other advertisement options may be shown. For example, if the currently viewed media program is of the TOUR OF CALIFORNIA, the viewer may be presented with a list showing a CLIF bar, a KOOBI bicycle seat, and a SPINERVALS video.

In another embodiment, the advertisement options presented to the user 132 include different combinations of groups of required and elective advertisements. Required advertisements are those that must be viewed by the user 132, while elective advertisements are those over which the user 132 has a choice. For example, if the user profile indicated that the user 132 was an avid bicyclist, the advertising options presented could include a list of advertisements from an elective group (e.g. advertisements having to do with cycling products or services) and a list of advertisements from a required group (for example, having to do with detergents or other staples that virtually everyone needs). In another embodiment, the advertisements presented to the user 132 can include required advertisements (the presentation of which the user 132 has no control) and elective advertisements (the presentation of which the user 132 has control). In this embodiment, the fee charged to the source of the goods or services described in the advertisement may be charged a different fee for required advertisements than elective advertisements).

The user 132 may select one or more of the optional advertisements provided, and these are the advertisements that will be shown during the advertisement break. The identity of the selected items (as determined by a PID or analogous value) can later be used to refine future advertisement selections that are presented to the user 132. In one embodiment, the identity of the selected items is transmitted external to the user computer 102 (for example, to the media program provider 110, to the advertising provider 140 or a third entity. In another embodiment, the identity of the selected items is held internal to the user computer 102 and not disclosed elsewhere. This embodiment increases the privacy of the viewer information. In yet another embodiment, a subset of the viewer information is transmitted external to the user computer 102, and other information is held secure within the user computer 102.

Presenting which advertisements the user 132 can view in future commercial breaks: The options presented to the user 132 may include advertisements for more than just the current commercial break. For example, the user 132 may be asked to select all of the advertisements that will be presented during the media program, for all commercial breaks.

Presenting Categories of Advertisements to the User 132. In this embodiment, the user 132 is presented with different categories of advertisements. In one embodiment, the categories offered to the user 132 become more specific as the user 132 makes advertisement choices of provides other information. For example, initially, the categories offered may be broadly described as "Home," "Auto," and "Outdoors", but if the user's choices indicate that the user 132 is more interested in the outdoors, the categories presented may be changed to sub-categories within the "Outdoor" category, such as "Winter Sports," "Summer Sports," and the like.

Presenting Options Controlling How the Advertisements are Presented in the Media Program: In another embodiment, the user 132 is presented with options describing how the advertisements are presented in the media program. These options may describe the timing of the presentation of the advertisements. In this case, subsets of advertisements can be provided in advertising blocks, and the user 132 can be given the option of expressing a user preference to describe the number and/or temporal distribution of advertisements to be presented in each block and the temporal distribution of the advertisement blocks within the streamed media program. For example, the user 132 may be required to view all of a set of advertisements, but given the option of seeing them widely dispersed throughout the media program (in other words, inserting two 30 second advertisements every 5 minutes rather than six 30 second advertisements every 15 minutes). Using this option, the user 132 may elect to view all of the advertisements in the beginning, the end, or in the middle of the media program, or the user 132 may elect to view the advertisements spread out over the length of the media program. Recognizing that the user 132 is less likely to remain seated and watch commercials that are presented during extended commercial breaks, the options presented to the user 132 may limit the user's control so that each commercial break must include at least n commercials and no more than m commercials, with typical values of n and m being 2 and 8, respectively.

The sponsor of the advertisement (the entity ultimately paying the media program provider 110 or associated entity for providing the media program and/or advertisement to the user 132) can be charged for the presentation of one or more of the advertisements an amount that is based on how the advertisement is to be presented in the streamed media program. In this embodiment, the sponsor can specify a timing structure that limits the user's options in determining when the advertisements are presented, or the sponsor may simply be charged differing amounts based upon when the user 132 decides to present the advertisement. For example, the sponsor may be asked to pay more for an advertisement that is the first in a block of advertisements in an advertising break.

The presented options may optionally include how the advertisements are presented in the viewer space. For example, the user 132 may be presented with the option of viewing the commercial on a pop-up window, optionally, with muted audio.

In block 510, the selected user preference options are accepted and stored. The selections can be locally stored in the user computer 102 or stored by the media program provider 110. As described above, the selected user preference options can be later used to determine which advertisement options to present to the user 132, or to determine which advertisements to present when the user 132 has not selected which advertisements they would like to be streamed along with the media program.

In one embodiment, the user 132 is provided with different (and optionally, preferential) options if the user 132 agrees to provide some kind of user compensation. Such user compensation can include the purchase of the streamed media program or the purchase of a product and/or service independent from the streamed media program. In other words, different user advertisement preference options can be provided if the user 132 has provided compensation by paying for the playback of the media program, or if the user 132 has provided some compensation unrelated to the playback of the media program. For example, the user 132 may want to view a media program comprising a movie, and want to view the movie either with few advertisements or none at all. In such a case, the user 132 is provided with the option of providing compensation for this privilege.

The compensation can take the form of the user 132 providing personal profile information about themselves and/or their viewing habits, ordering a product, or ordering a service. In the example of a user 132 wanting to view a media program without any advertisements, this can be accomplished by ordering a pizza, groceries, or any product or service from an authorized source, regardless of whether the source has any connection whatever to the chosen media program. In this situation the media program provider 110 is compensated by the source from which the order was made, in the form of a percentage of the gross value of the sale, the profit of the sale, or by a fixed fee. Consequently, any user 132 desirous of viewing media programs without advertisements need only order their groceries (for example) using the media program provider 100.

The purchase options presented to the user 132 may include only those which are related to the content of the selected media program (as determined by metadata associated with the selected media program), or may include products and services unrelated to the selected media program. The purchase options presented to the user 132 may include products and/or services from vendors who are in a pool of advertisers whose advertisements are shown using the CDS 300. Alternatively, the purchase options presented to the user may include products and/or services from vendors who are not advertisers (e.g. advertisements for the providers are not among those that can be presented to the user). For example, a provider may join a group of product and service providers that wish to be listed as approved vendors that the user may order products and services from in order to obtain preferential advertisement options.

In one embodiment, the providers of the products and services which may be ordered by the user 132 pay for the privilege of being included in the list of product of service providers that the user can choose from. In another embodiment, the providers of the products pay only when a user orders a product of service from the provider. In still another embodiment, the provider pays a fee for being included in the list that the user 132 can choose from and an additional fee is charged when the user orders a product or service from the provider.

The foregoing functionality is illustrated in blocks 512-518 of FIG. 5A. Block 512 determines whether the user 132 has provided compensation by making the appropriate selection of user ad preference options. An indicia of the provided compensation (which identifies the compensation provided and the user 132 providing it) is then provided to the media program provider 110 or an external entity. These operations are shown in block 512. In blocks 514 and 516, the media program provider 110 determines the compensated user preference options and transmits them to the user computer 102 to be presented to the user 132. The compensated user preference options can include a selection of advertisements differing from those presented to users not providing compensation, different options regarding how the advertisements are presented in the streaming media program, or an option of having no advertisements at all.

Figure 5B:
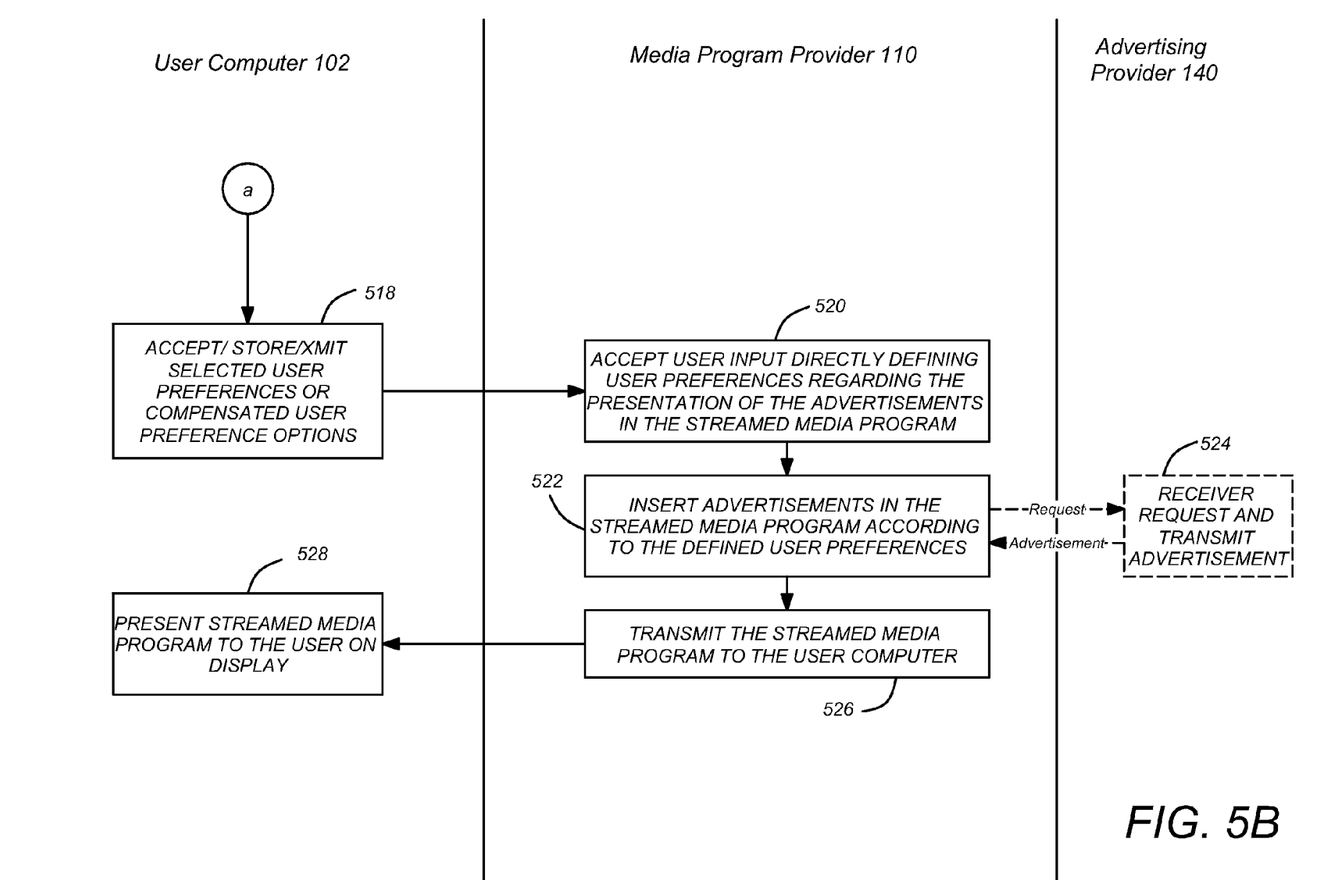

Turning to FIG. 5B, the selected user preferences or compensated user preferences are accepted, stored and transmitted to the media program provider 110, as shown in block 518. The media program provider 110 accepts the user 132 input defining the user preferences regarding the presentation of the advertisements in the streaming media program, as shown in block 520. In one embodiment, the user input directly defines user preferences regarding the presentation of advertisements in the streamed media program.

In this context, user input "directly defining" is to be distinguished from indirect user input that can be used to identify appropriate advertisements. For example, it is known to monitor a user's clickstream to determine which advertisements are supplied to a user 132 within webpages. However, while the clickstream may indirectly define which advertisements are presented, it does not define which advertisements are presented during a streaming media program and does not directly define the advertisements that are presented. At best, in this case, the user's desires regarding advertisements are inferred from the clickstream, they are not directly provided. One example of direct definition of advertisement preferences is the case where the user 132 is provided with a list of advertisements, and allowed to choose which advertisements of those on the list they would like to view.

Given the provided user preferences, the media program with the inserted advertisements are provided to the user computer 102. This can be accomplished as shown and described with reference to FIG. 3 (in which the media program with advertising breaks is provided from the media program provider 110 and the user computer retrieves the advertisements) or as shown in FIG. 5B (in which the media program provider 110 retrieves the advertisements (either from storage in the media program provider 110 itself or through advertising provider 140) and inserts those advertisements in the streamed media program before providing it to the user computer 102 for display. The technique shown in FIG. 5B is advantageous in that the media program provider 110 retains control over the presentation of the streaming media, making it more difficult for modifications in the software of the user computer 102 to circumvent the retrieval and presentation of advertisements. With this technique, the media program provider 110 requests advertisements that comply with the defined user preferences, and receives the appropriate advertisements from the advertising provider 140. These advertisements are inserted into the streamed media according to the user-defined preferences and transmitted to the user computer 102 where they are presented on a display.

Figure 6A:
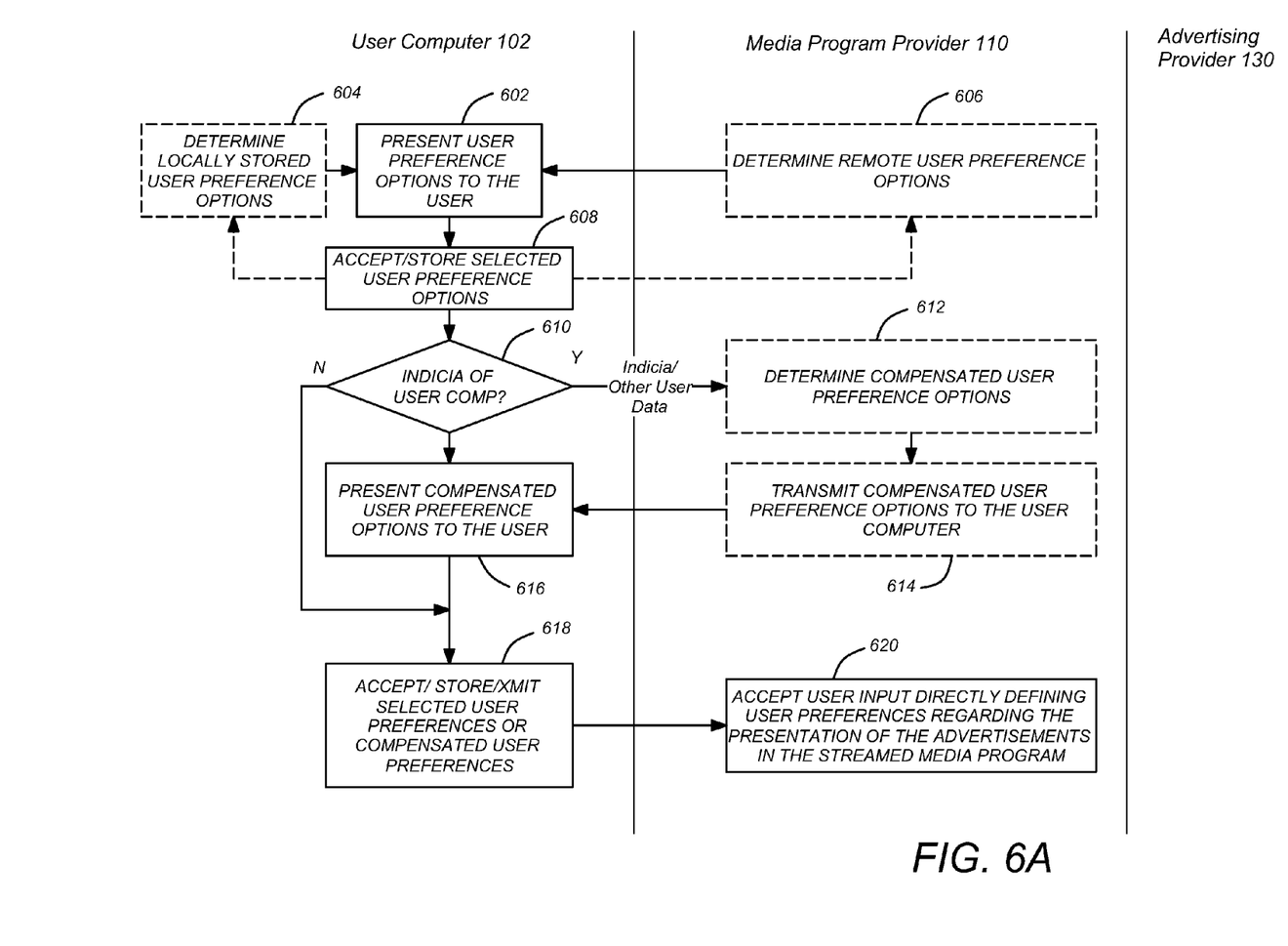
FIGS. 6A and 6B are flowcharts illustrating exemplary method steps that can be used to practice another embodiment of the invention.
Figure 6B:
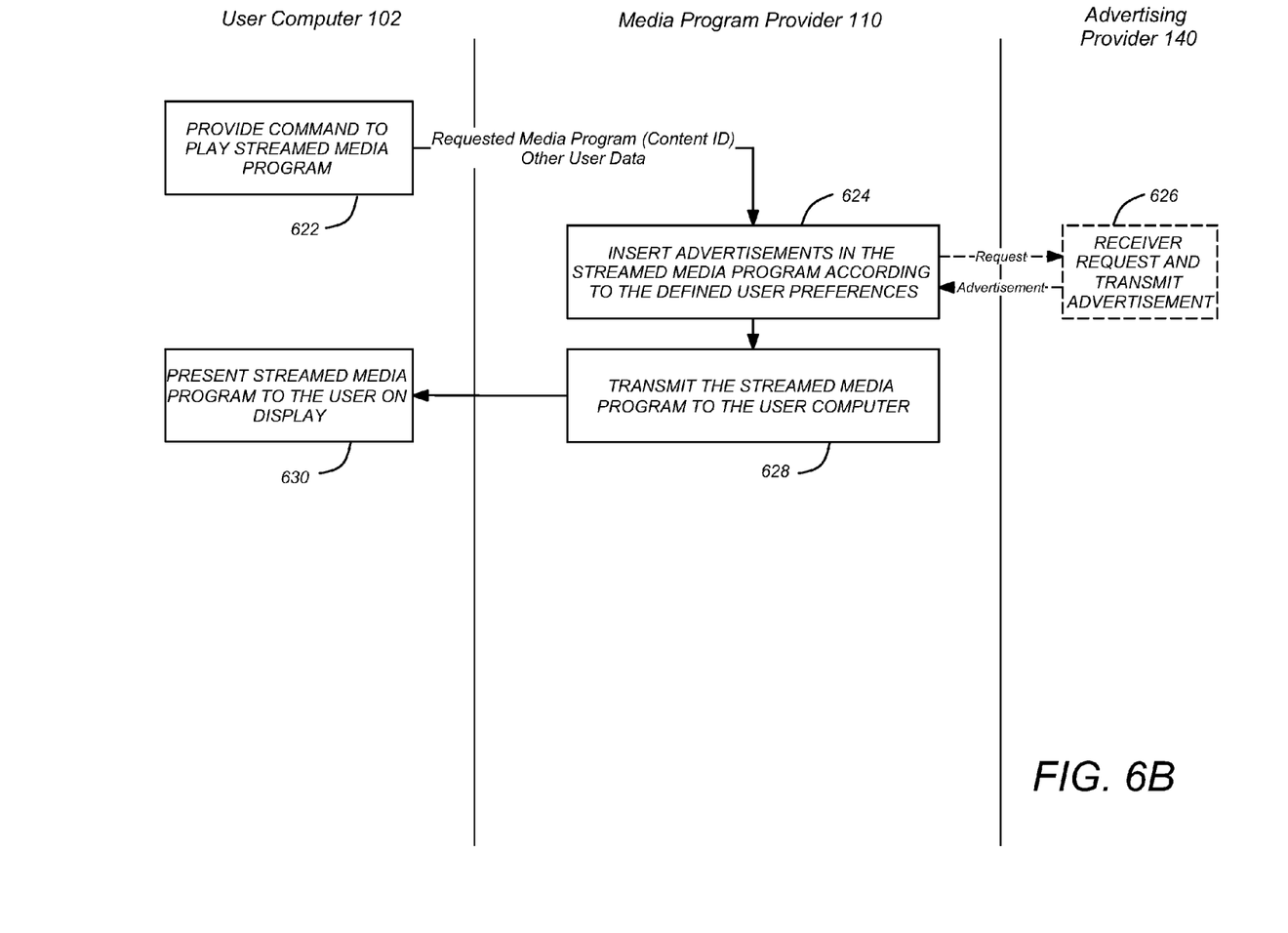

FIGS. 6A and 6B are flowcharts illustrating exemplary method steps that can be used to practice another embodiment. In this embodiment, the user preference options are presented to the user 132 before the media program playback is requested. Turning to FIG. 6A, in block 602, user preference options are presented to the user 132. As before, such options can be locally stored (block 604 or stored remotely as shown in block 606). The selected user preferences are accepted and stored, as shown in block 608.

Next, in embodiments that include provision for compensated user preferences and options when the user 132 provides compensation, block 610 determines if an indicia of user compensation was entered by the user 132. If so, compensated user preference options are determined and transmitted to the user computer 102 and presented to the user 132, as shown in blocks 612-616. The user computer 102 accepts, stores, and transmits user preferences or compensated user preferences, and transmits them to the media program provider 110 as shown in block 618. The media program provider 110 then accepts the user input directly defining user preferences regarding the presentation of the advertisements in the streamed media program as shown in block 620.

Turning to FIG. 6B, a command is provided to play a streamed media program, as shown in block 622. The request is transmitted to the media program provider 110. In the embodiment illustrated in FIG. 6B, the media program provider 110 inserts advertisements in the streamed media program according to the defined user preferences and transmits the streamed media program with the advertisements to the user computer 102 for presentation, as shown in blocks 624 and 628. However, as described above, this can be accomplished using a different paradigm wherein the media program provider 110 transmits the streaming media program and identifies the advertising breaks, and the user computer 102 retrieves the advertisements directly from the advertising provider 140. Finally, the streamed media program is presented to the user 132 on the display 222.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of providing an advertisement with a streamed video program having at least one advertising break, comprising the steps of:

receiving first data from a user device in a video program provider, the first data identifying the video program to be streamed to the user device;

transmitting second data from the video program provider to the user device separately from the video program before a streaming video request is received from the user device and the video program is streamed to the user device, the second data comprising a resource locator for the video program and metadata explicitly defining a location of an advertising break within the video program relative to one of the beginning or end of the video program, but not information on which advertisements should be inserted in the advertising break;

upon receiving the streaming video request using the resource locator to cause streaming of the video program to the user device and in response to occurrence of the advertisement break defined by the second data for the video program playing on the user device, transmitting third data to the user device, the third data comprising advertising options consisting essentially of alternative advertisements from which only one advertisement may be selected for viewing during the advertisement break;

streaming a user-selected one of the alternative advertisements to the user device during the advertising break and storing the identifier of the user-selected one of the alternative advertisements in the video program provider, if fourth data indicating the user-selected one of the alternative advertisements is received from the user device;

if the fourth data is not received from the user device, selecting a provider-selected advertisement after determining that the user has not selected one of the alternative advertisements, and then streaming the provider-selected advertisement to the user device during the advertising break; and the video program comprises a plurality of advertising blocks, each advertising block comprising one or more advertisements;

the advertising options further comprise data defining a number and temporal distribution of the one or more advertisements to be presented in each of the plurality of advertising blocks and the temporal distribution of the blocks within the streamed video program; and the fourth data further comprises a selected number and selected temporal distribution of the one or more advertisements to be presented in each of the plurality of advertising blocks and the selected temporal distribution of the blocks within the streamed video program selected based on user input to the user device.

2. The method of claim 1, further comprising the step of: wherein the alternative advertisements are determined according to previously user-selected advertisement identifiers stored by the video program provider.

3. The method of claim 2, further comprising the step of: selecting the provider-selected advertisement according to previously user-selected advertisement identifiers that were stored from previous user-selected advertisements that were previously selected by a user if the fourth data is not received from the user device.

4. The method of claim 1, wherein the advertising options are presented for selection only if an indicia of user compensation is provided by the user.

5. The method of claim 4, wherein the user compensation comprises a purchase independent from a purchase of the streamed video program.

6. The method of claim 5, wherein the purchase is related to content of the streamed video program as determined by the metadata.

7. The method of claim 6, wherein the advertisements are obtained from a pool of advertisers and the purchase is associated with at least one of the advertisers in the pool of advertisers.

8. An apparatus for providing an advertisement with a streamed video program having at least one advertising break, comprising:

a video program provider having:

a content selector receiving first data from a user device, the first data identifying the video program to be streamed to the user device and for transmitting second data from the video program provider to the user device separately from the video program before a streaming video request is received from the user device and the video program is streamed to the user device, the second data comprising a resource locator for the video program and metadata explicitly defining a location of an advertising break within the video program by a measure of time relative to one of the beginning or end of the video program, but not information on which advertisements should be inserted in the advertising break;

a communication device transmitting third data to the user device upon receiving the streaming video request using the resource locator to cause streaming of the video program to the user device and in response to occurrence of the advertisement break defined by the second data for the video program playing on the user device, the third data comprising advertising options consisting essentially of alternative advertisements from which only one advertisement may be selected for viewing during the advertisement break;

an advertisement server streaming a user-selected one of the alternative advertisements to the user device during the advertising break and storing the identifier of the user-selected one of the alternative advertisements in a memory, if fourth data indicating the user-selected one of the alternative advertisements is received from the user device, and if the fourth data is not received from the user device, selecting a provider-selected advertisement after determining that the user has not selected one of the alternative advertisements, and then streaming the provider-selected advertisement to the user device during the advertising break; and the video program comprises a plurality of advertising blocks, each advertising block comprising one or more advertisements;

the advertising options further comprise data defining a number and temporal distribution of the one or more advertisements to be presented in each of the plurality of advertising blocks and the temporal distribution of the blocks within the streamed video program; and the fourth data further comprises a selected number and selected temporal distribution of the one or more advertisements to be presented in each of the plurality of advertising blocks and the selected temporal distribution of the blocks within the streamed video program selected based on user input to the user device.

9. The apparatus of claim 8, wherein the alternative advertisements are determined according to previously user-selected advertisement identifiers stored by the video program provider.

10. The apparatus of claim 9, wherein the video program provider further comprises: a processor for selecting the provider-selected advertisement according to previously user-selected advertisement identifiers that were stored from previous user-selected advertisements that were previously selected by a user if the fourth data is not received from the user device.

11. The apparatus of claim 8, wherein the advertising options are presented for selection only if an indicia of user compensation is provided by the user.

12. The apparatus of claim 11, wherein the user compensation comprises a purchase independent from a purchase of the streamed video program.

13. The apparatus of claim 12, wherein the purchase is related to content of the streamed video program as determined by the metadata.

14. The apparatus of claim 13, wherein the advertisements are obtained from a pool of advertisers and the purchase is associated with at least one of the advertisers in the pool of advertisers.

15. The method of claim 1, wherein the stored identifier of the user-selected one of the alternative advertisements is used to determine future provider-selected advertisements when the user does not select one of alternate advertisements presented to the user.

* * * * *